US008320259B2

(12) United States Patent
Zhou et al.

(10) Patent No.: US 8,320,259 B2
(45) Date of Patent: Nov. 27, 2012

(54) ACCESS CIRCUIT TEST FOR TRANSFER ENGINEERING

(75) Inventors: Ping Zhou, Ipswich (GB); Andrew D Chattell, Ipswich (GB); Mark Hockly, Colchester (GB)

(73) Assignee: British Telecommunications public limited company, London (GB)

( * ) Notice: Subject to any disclaimer, the term of this patent is extended or adjusted under 35 U.S.C. 154(b) by 544 days.

(21) Appl. No.: 12/527,808

(22) PCT Filed: Jan. 18, 2008

(86) PCT No.: PCT/GB2008/000180
§ 371 (c)(1),
(2), (4) Date: Aug. 19, 2009

(87) PCT Pub. No.: WO2008/104732
PCT Pub. Date: Sep. 4, 2008

(65) Prior Publication Data
US 2010/0034099 A1 Feb. 11, 2010

(30) Foreign Application Priority Data
Feb. 28, 2007 (GB) .................................. 0703898.7

(51) Int. Cl.
*H04J 3/14* (2006.01)
(52) U.S. Cl. .......................................... 370/241; 370/242
(58) Field of Classification Search .................. None
See application file for complete search history.

(56) References Cited

U.S. PATENT DOCUMENTS 3,752,940 A 8/1973 Santulli et al.
2009/0247155 A1* 10/2009 O'Neill .......................... 455/433

FOREIGN PATENT DOCUMENTS

JP 57-208758 12/1982

OTHER PUBLICATIONS

International Search Report for PCT/GB2008/000180, mailed May 6, 2008.

* cited by examiner

*Primary Examiner* — Kevin C Harper
(74) *Attorney, Agent, or Firm* — Nixon & Vanderhye P.C.

(57) ABSTRACT

A test system for testing a pair of telecommunications access networks, e.g. as part of transfer engineering. The system comprises a test head for connection, via an access arrangement, to first and second access networks. In a first phase, the access arrangement is arranged to connect the test head to the first access network for sending a first request from the tester to, for example, a CLI server via the first access network. The first request comprises a parameter associated with a user line. The tester is arranged to receive in response to the first request a first identifier from the server. In a second phase, the access arrangement is arranged to connect the test head to the second access network for sending a second request from the test head through the second access network to, for example, a CLI server. The second request also comprises the parameter. The tester is arranged to receive, in response to the second request, a second identifier from the target server and is arranged to carry out a comparison operation involving the first and second identifiers received in response to the two requests. A mismatch can indicate a fault or misconnection in either access network or a problem with network configuration data.

22 Claims, 2 Drawing Sheets

ACCESS CIRCUIT TEST FOR TRANSFER ENGINEERING

This application is the U.S. national phase of International Application No. PCT/GB2008/000180, filed 18 Jan. 2008, which designated the U.S. and claims priority to UK Application No. GB0703898.7 filed 28 Feb. 2007, the entire contents of each of which are hereby incorporated by reference.

BACKGROUND AND SUMMARY

The invention is directed to testing telecommunications access circuits and has particular application to transfer engineering testing prior to transfer of service from an old technology network to new technology network.

There is an increasing trend to transfer telecommunications traffic from old technology networks to networks based on new technology such as Internet Protocol (IP). BT's 21CN is an end-to-end IP-based network replacing complex old-technology network and systems infrastructure to provide faster, more efficient and more cost-effective delivery of converged services. The transfer process is often referred to as "transfer engineering".

FIG. 1 shows part of a conventional, 20CN telecommunications network of the type that is suitable for replacement with new technology. The 20CN telecommunications network of FIG. 1 comprises a first, 20CN access network 200. 20CN access network 200 connects between main distribution frame (MDF) 10 and into the pubic switched telephone network (PSTN) 300 for connecting voice calls. In addition, access network 200 has a connection into an internet service provider network (not shown) for broadband connections.

MDF 10 is an integral part of a telephone exchange or central office and is divided into two sides. On the subscriber or D-side, the MDF provides terminations for cables connecting to telecommunications terminal equipment, 30, 40 located at the user's premises (e.g. telephone apparatus 30 and computer 40—connected via a broadband DSL connection to be described later). On the exchange or E-side, MDF 10 provides terminations for cables for connection to a telephone switch or other: communications service provider equipment—depending on whether it is a broadband (DSL) or narrowband (POTS voice band) circuit. Users are connected to the appropriate piece of service provider equipment by manually connecting a jumper wire between the user connection on the D-side and the appropriate service provider equipment connection on the E-side.

As shown in FIG. 1, MDF 10 comprises standard E-side connection points 80, 90. In the 20CN access network, standard connection point 80 is patched in the MDF 10 to the D-side narrowband connection to the user's telephone apparatus 30 and is dedicated to providing a narrowband service to the user.

E-side connection point 90 is patched in the MDF 10 to the D-side broadband connection to the user's computer 40 and is dedicated to connecting a broadband service to the user.

Turning now to the network side of MDF 10, connection point 80 on MDF 10 is connected to the 20CN access network for voice services via Remote Concentrator Unit (RCU) 210. RCU 210 concentrates a number of analogue local user lines digitises them into IP packets which are then concentrated to provide a multiplex connection to 20CN Digital Local Exchange (DLE) 220.

Connection point 90 on MDF 10 connects to digital subscriber line access multiplexer (DSLAM) 230. In a similar way to RCU 210, DSLAM 230 concentrates a number of connections, in this case broadband (i.e. DSL) connections, from a plurality of users onto a multiplex connection to Broadband Remote Access Server (BRAS) 240. BRAS 240 forms an interface from the 20CN access network to an internet service provider network (ISP), i.e. providing internet access to the user via a broadband connection. It is noted that the broadband connection at connection point 90 is also connected to RCU 210 via another port on DSLAM 230, the D-side of MDF 10 and a second connection at E-side connection point 80.

Also connected to PSTN 300 is calling line identification (CLI) server 350. Modern telephone networks implement a caller identification function, often referred to as CLI. The idea behind CLI is that a called party's telephone can be provided with the number of the calling party's telephone during the ringing phase, i.e. before the called party has answered the call. In FIG. 1, this function is provided by CLI server 350 which conventionally provides an interface to the 20CN access network.

Service providers can exploit the CLI server to support a simple ring-back test. This works by dialling a special, non-geographical number on the user's telephone which is detected by the local exchange and routed to the appropriate CLI sever as a ring-back request. The request includes the DN associated with the user's telephone connection. The CLI server responds, once the call has been terminated on hanging up the user's telephone, by calling back the user using the DN received with the request. An automated version of this simple ring-back test is implemented on BT's 20CN to provide an in-life check on the correct operation of a user's apparatus and associated parts of the 20CN access network. The originating Line ID (OLID) test is an automated version of the simple ring-back test that can be performed under control of test controller 170 via 20CN test head 260 connected at RCU 210. A manual version of the OLID test is available from the user's telephone.

To initiate an OLID test, an engineer supplies a request, together with the DN relating to the access line to be tested, to the test controller GTC 170. GTC 170 then acts to control the 20CN test head 260 to run the test, accessing the 20CN via test head 260 and RCU 210.

Other tests, known as in-life or BAU tests, have been developed for testing everyday operation of 20CN 200. The BAU tests involve using 20CN test equipment 260 connected at the RCU 210 to test the 20CN access network 200. 20CN test equipment 260 can run tests to check line voltage and detect dial tone on a user's connection from RCU 210.

There is a need for new tests to check the connection and operation of pairs of circuits, one from the 20CN and the corresponding one from the 21CN and to allow configuration data for these circuits to be verified. Configuration data may be stored in a database or in two separate databases: one for 20CN and another for 21CN configuration data.

The present invention provides a method of testing a first telecommunications access network and a second telecommunications access network, in which the method includes the steps of: sending a first request from a test point on the second access network to a server via the first access network; in which the first request comprises a parameter associated with a user line; in response to the first request, receiving a first identifier from the server; sending a second request from the test point through the second access network to a server; in which the second request also comprises the parameter; in response to the second request, receiving a second identifier from the server; and carrying out a comparison operation involving the first and second identifiers received in response to the two requests.

The comparison operation is preferably performed in test equipment forming part of the second access network.

According to one aspect, the method includes connecting the test point to a distribution frame connected to the first access network. According to further aspects the comparison operation includes comparing, the first identifier with the second identifier and/or the comparison operation includes comparing, the first and second identifiers with the parameter and/or the parameter is a directory number allocated to the user.

According to a further aspect the second access network is for connecting a user line transferred from the first access network.

According to a further aspect, the method includes checking access network configuration data.

According to a further aspect, the method includes using test equipment comprised in the first access network to a perform further tests and preferably using the first access network test equipment to draw dial tone from first access network equipment in order to diagnose fault conditions. Preferably, the first access network test equipment is used to test a line from the first access network equipment in order to diagnose fault conditions.

According to a further aspect, the method includes operating a test access matrix connected in the second access network between the user and a central telecommunications network to connect the second access network test equipment towards the user for the first request and towards the central telecommunications network for the second request.

The present invention also provides a test system for a first telecommunications access network and a second telecommunications access network, comprising test equipment for connection via an access arrangement to the first and second access networks; in which the access arrangement is arranged to connect the test equipment to the first access network for sending a first request from the test equipment to a server via the first access network; in which the first request comprises a parameter associated with a user line; in which the test equipment is arranged to receive in response to the first request a first identifier from the server; in which the access arrangement is arranged to connect the test equipment to the second access network for sending a second request from the test equipment through the second access network to a server; in which the second request also comprises the parameter; in which the test equipment is arranged to receive in response to the second request a second identifier from the server; and in which the test equipment is arranged to carry out a comparison operation involving the first and second identifiers received in response to the two requests.

The test equipment is preferably arranged for operation in the second access network and may include means for checking access network configuration data.

According to a further aspect, the access arrangement is arranged to connect the test equipment to a distribution frame connected to the first access network.

According to further aspects the comparison operation includes comparing, the second identifier with the first identifier and/or comparing, the second and first identifiers with the parameter.

According to a further aspect, the second access network is for connecting a user line transferred from the first access network.

The test system is preferably arranged to use test equipment comprised in the first access network to perform further tests and may be arranged to use the first access network test equipment to draw dial tone from first access network equipment in order to diagnose fault conditions and/or to test a line from the first access network equipment in order to diagnose fault conditions.

The access arrangement is preferably arranged to be connected in the second access network between the user and a central telecommunications network to connect the test equipment towards the user for the first request and towards the central telecommunications network for the second request.

BRIEF DESCRIPTION OF THE DRAWINGS

Embodiments of the invention will now be described by way of example with reference to the drawings in which.

DETAILED DECRIPTION OF PRESENT EXAMPLE EMBODIMENTS

Figure 1:
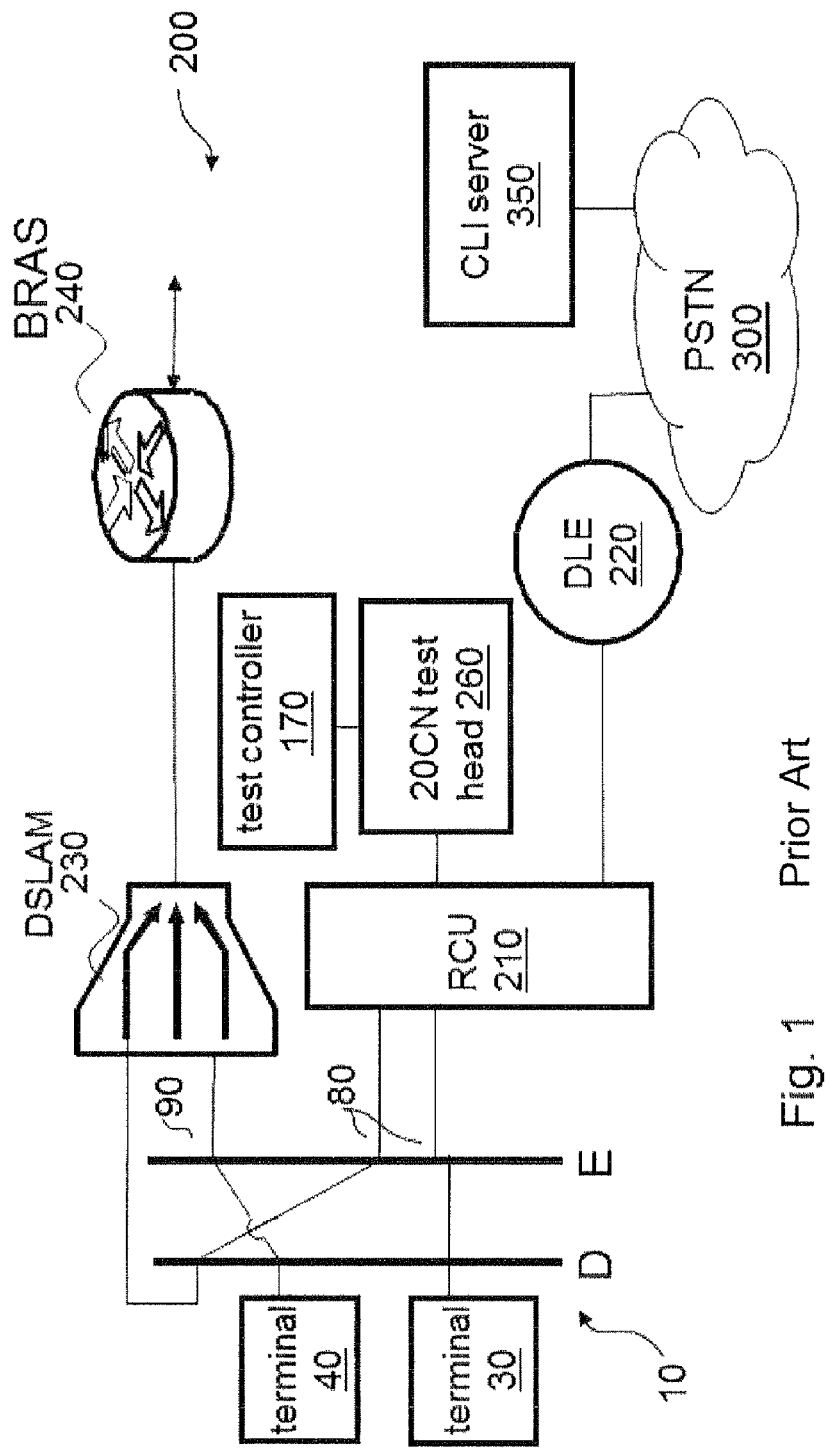
FIG. 1 shows a functional block diagram of a conventional access network.
Figure 2:
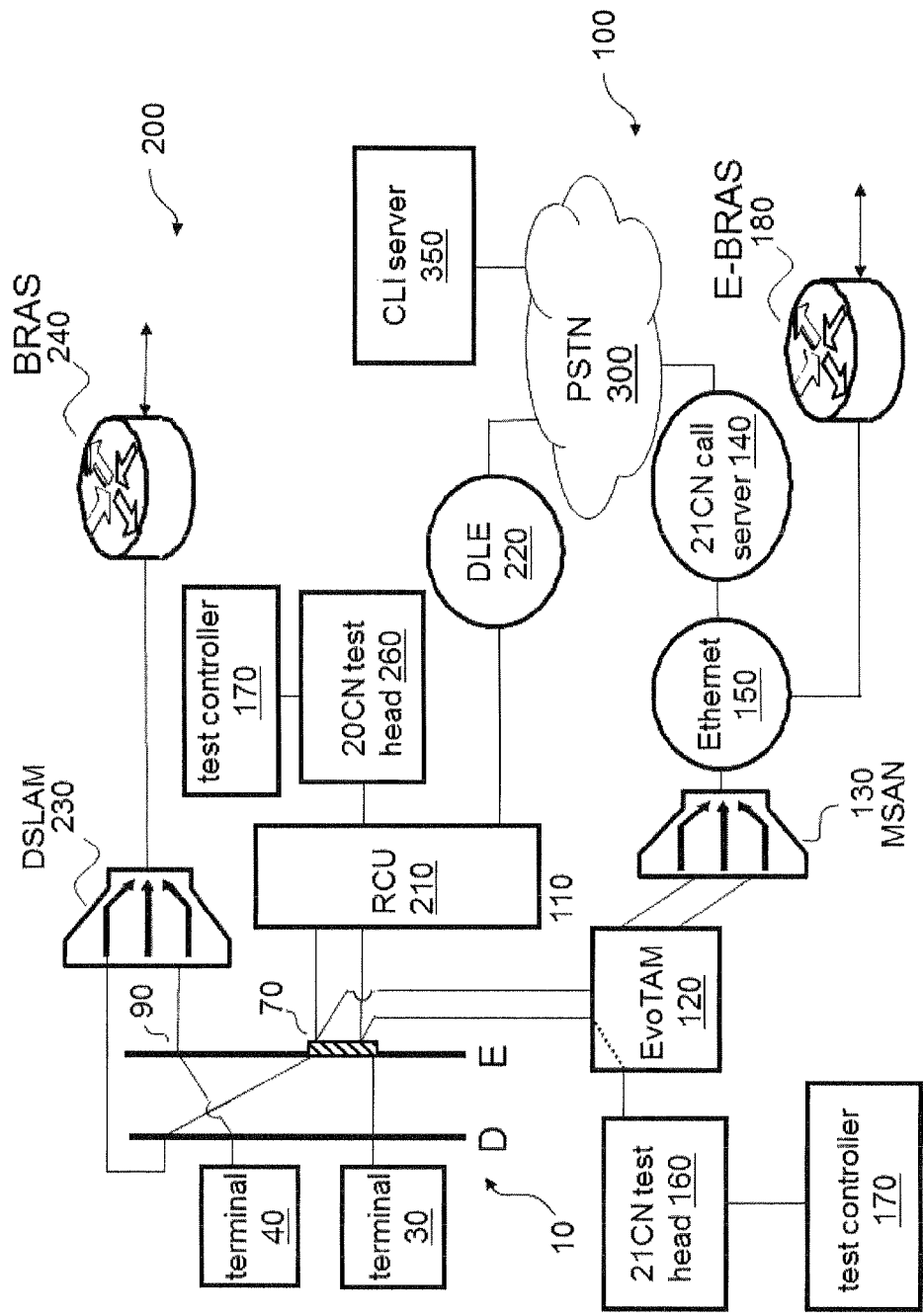
FIG. 2 shows a functional block diagram of a transfer engineering test arrangement according to the present invention.

FIG. 2 shows part of a dual telecommunications access network in which the invention may be implemented, comprising first, 21CN access network 100 and second, 20CN access network 200. Both networks share main distribution frame (MDF) 10. Both access networks 100, 200 connect into the pubic switched telephone network (PSTN) 300 for connecting voice calls. In addition, each access network 100, 200 has a connection into an internet service provider network (not shown) for broadband connections. Details of 20CN 200 that are as previously described with reference to FIG. 1 will not be described further here.

According to a first aspect of the invention, as shown in FIG. 2, standard connection point 80 on the E-side of MDF 10 is replaced with transfer connection point (TCP) 70. TCP 70 is installed by modifying a standard E-side connection, as described below. As described above with reference to FIG. 1, in the 20CN access network, standard E-side connection 80 connects the user's narrowband connection from telephone apparatus 30 to the 20CN via RCU 210. TCP 70 differs from standard connection 80 in that it is a 3-way connection point with the addition of connections to 21CN links 110. The addition of the third connection to standard connection point 80 means that the user's line at the MDF can be connected to both 20CN access network 200 and 21CN access network 100. The three-way connection at the MDF TCP 70 is established to interconnect the RCU 210 (in 20CN 200), the EvoTAM 120 (in 21CN 100) and the line to the user's terminals (telephone, 30 And computer, 40). Advantageously, links 110 between EvoTAM 120 and TCP 70 on MDF 10 also provide access to 20CN 200 from EvoTAM 120 and, via EvoTAM, from the 21CN test head 160.

Once the transfer engineering phase is competed, TCP 70 can revert to a standard, two-way connection point only connecting the user's line at the MDF to 21CN access network 100. The three-way TCP 70 is exploited in carrying out the invention, as described below.

Connection point 90 is unchanged and continues to connect the broadband connection from the user's computer 40 with 20CN DSLAM 230. The further broadband connection via DSLAM 230, the D-side of MDF 10 and the second connection at E-side connection point 80 is maintained with TCP 70 replacing connection point 80. 21CN links 110 connect both the narrowband and broadband connections from TCP 70 with 21CN test access matrix EvoTAM 120.

The EvoTAM 120 is a test access matrix for the 21CN access circuit 100. As with a conventional test access matrix, the primary role of the EvoTAM 120 is to provide a channel for connecting test equipment to parts of the access network: in the case of the EvoTAM, to parts of the 21CN access network 100. EvoTAM 120 provides test head 160 with access to 21CN lines for both service and line testing. The operator of the 21CN access network 100 is therefore able to implement tests in the 21CN access network in which the tests are generated by test head 160 and connected via EvoTAM 120 under control of test controller (GTC) 170.

According to a second aspect of the invention, EvoTAM 120 has additional functions to those of a standard TAM in providing isolation of the 20CN connections at MDF 10 and the 21CN before transfer of service and in connecting the 21CN to the user's equipment via MDF 10 on transfer of service.

According to a preferred embodiment, the inventors have modified the standard EvoTAM with the inclusion of an additional relay connected in the line running between MDF 10 and MSAN 130 in order to achieve the additional function. In preparation for transfer of service, EvoTAM 120 is connected, on the one side, via links 110 towards the MDF 10, itself prepared for transfer of service by upgrade of standard connection point 80 to three-way TCP 70 and still connected to 20CN access circuit 200. On the other side, EvoTAM 120 is connected to the 21CN Multi Service Access Node (MSAN) 130. The extra relay (not shown) allows link 110 to be installed prior to transfer of service without having the 20CN access network 200 and the 21CN access network 100 both connected to the same connection point on MDF 10 at the same time. In the transfer engineering process, EvoTAM 120 is used to physically switch the user connection to the 21CN 100.

MSAN 130 connects the user's narrowband device (telephone 30) and broadband device (computer 40) to the local 21CN network. Unlike the 20CN access network, the 21CN access network is able to provide both narrowband and broadband services over a single connection. The MSAN 130 is connected to 21CN call server 140 via Ethernet connection 150, also known as an Ethernet back haul. 21CN call server 140 is connected to the PSTN 300 and, via PSTN 300, to CLI server 350. The MSAN 130 also connects call server 140 via Ethernet connection 150 to Ethernet Broadband Remote Access Server E-BRAS 180 which forms an interface to an internet service provider network (not shown), i.e. providing internet access to the user via a broadband connection.

According to the first detailed embodiment of the invention, testing the connection and operation of pairs of access circuits of the 20CN and 21CN is achieved by reading, from a point on the 21CN, via the access circuits of both the 20CN and 21CN, CLI parameters relating to a particular user. The parameter conventionally used in CLI severs is the user's directory number or DN. The invention also has application in testing circuits paired for other reasons and destined to provide a common service.

The user's DN is used to represent a service identifier related to the voice band (i.e. narrowband) telephony service provided to a user. In modern practice, the number of the user's account with the service provider identifies the narrowband service and any broadband service allocated to that user.

EvoTAM 120 needs to be configured for the purposes of the invention. In addition to its normal role in connecting attached test head 160 to MSAN 130, EvoTAM 120 is configured to connect test head 160 back toward MDF 10 and, via TCP 70, to 20CN 200. The reconfigured EvoTAM 120 is therefore capable of switching test head 160 to both 21CN 100 and 20CN 200 to perform transfer engineering tests.

The first stage of the test consists in sending a first request to CLI server 350 from test head 160 (located on 21CN access circuit 100) via first, 20CN access circuit 200. To do this, EvoTAM 120 switches test head 160 to TCP 70 via links 110. In fact the request comprises a parameter DN identifying a service in both 21CN and a 20CN access circuits. After the request is sent, test head 160 monitors traffic over 20CN access network 200 from CLI server 350 for a response comprising a first line identifier (20CN CLI). If successfully received, this indicates that there is physical connectivity from 21CN test head 160 through to 20CN access network 200 to CLI server 350.

Once received, the first line identifier (20CN CLI) is compared with the parameter (DN) comprised in the first request to verify the correctness of the physical connection in the second, 20CN access network against configuration data. The specific configuration data verified here will be that linking the DN with the ports of EvoTAM 120 pointing towards MDF 10 together with configuration data for RCU 210 and DLE 220. The next stage checks other configuration data.

The second stage of the test consists in sending a second request (comprising the same parameter DN) from test head 160 to CLI server 350 via the second, 21CN access circuit 100. To do this, EvoTAM 120 now switches test head 160 to MSAN 130. After the request is sent, test head 160 monitors traffic over 21CN access network 100 from CLI server 350 for a response comprising a second line identifier (21CN CLI) to the second request. If successfully received, this indicates that there is physical connectivity from the 21CN test point 160 through the 21CN access network 100 to CLI server 350. It will be understood that the two stages of the test may change order or be interleaved without deviating form the inventive concept.

Variants of the invention may use a different parameter to the conventional DN, including port numbers on service provider equipment in the 20CN and 21CN access networks 200, 100.

Once received, the second line identifier (21CN CLI) is compared with the parameter (DN) comprised in the second request to verify the correctness of the physical connection in the first, 21CN access network 100 against configuration data. The specific 21CN configuration data verified here will be that linking the DN with the ports EvoTAM 120 pointing towards MSAN 130 together with configuration data for MSAN 130 and CallServer 140.

According to the first embodiment of the invention, when 20CN CLI and 21CN CLI are found not to match DN, 20CN CLI is compared with 21CN CLI to give detailed diagnosis of problem causes.

Comparison of the two received CLI values provides an indication whether each access circuit is correctly configured and whether the physical connections are correct. Although the same parameter (DN) is used in both tests, the results can also indicate if an error is present in the physical connection or configuration data defining the new 21CN. If received 20CN CLI is found to match received 21CN CLI but neither matches DN, the problem cause is likely to be an incorrect 21CN data build, where DN is wrongly associated with a 21CN circuit (i.e. MDF 10 connections and/or EvoTAM 120 ports), and the problem cause is unlikely to be physical connection.

According to a second detailed embodiment of the invention, the tests are run as above but the first check is between the CLI values received in the first and second stages, rather than comparing each CLI with the value of DN used in the requests. If this check indicates that CLI1 does not match CLI2, then the CLI values are compared with DN. A mismatch may result from the second request actually being directed to a different CLI server from the first request.

The above transfer engineering test has been developed by the inventors to allow pairs of 20CN and 21CN access circuits to be verified before traffic is switched from the 20CN over to the new 21CN. Other tests, often known as BAU tests, have been used for testing everyday operation of the 20CN and/or 21CN access network and may be used, according to a further aspect of the invention, in combination with the transfer engineering test to investigate further, problems indicated by the transfer engineering test. Amongst other aspects, the BAU tests may be used to check connections from the EvoTAM 120 to the new 21CN access network 100. As indicated in FIG. 1, BAU test head 260 is connected to RCU 210 to provide BAU test operations on 20CN access network 200, including checking for exchange faults on a line from RCU 210 to MDF 10 by performing a copper line test (narrow band test) and checking for a faulty RCU port by attempting to draw dial tone from RCU 210.

The proposed transfer engineering tests differ from the BAU tests in a number of aspects. The transfer engineering tests involve switching 21CN test equipment test head 160, EvoTAM 120 to look "out" towards the user (i.e. in the direction of MDF 10) to monitor for CLI, rather than towards the 21CN network 100 that the test equipment is originally intended to monitor for CLI. The transfer engineering tests also involves using 21CN test equipment (i.e. test head 160 and EvoTAM 120) to get a CLI from CLI Server 350 via 20CN RCU 210 and TCP 70.

It is worth noting that 20CN 200 and 21CN 100 are not designed to be run in parallel. 21CN 100 is intended to render 20CN 200 redundant. According to the invention the two networks remain isolated by means of EvoTAM 120 before the transfer and by reducing the three-way TCP connection 80 to two-ways after the transfer. Despite the introduction of new links 110 between the 20CN 200 and 21CN 100, described above, the EvoTAM 120 blocks the connection to 21CN 100 by keeping the extra relay open until the new 21CN is brought into use. This effectively isolates 21CN 100 from the user and from the 20CN 200, whilst allowing access to 20CN 200 by 21CN test equipment test head 160. Once the new 21CN 100 is brought into operation, the three-way connection at the MDF is transformed to a two-way connection between the user line to terminals 30, 40 and EvoTAM 120 (i.e. giving the user access to new 21CN 100). The connection between the user line and 20CN 200 (i.e. from the MDF 10 connection point 80 to RCU 210 and from connection point 90 to DSLAM 230) is cut—so disconnecting the user from the old, 20CN.

The MDF 10 is common to both networks, being used for 20CN traffic before the transfer and for 21CN traffic thereafter.

Whereas 20CN 200 has separate exchange equipment or circuits for voice-band and broadband communications, the new 21CN MSAN 130 is a single equipment with voice band and broadband circuit integration. As well as building the 21CN physical network, creating the 21CN involves building 21CN data that maps 20CN services data (on RCU & DSLAM) to 21CN service data. The 21CN data is loaded onto EvoTAM 120, MSAN 130 and Call Server 140. The tests use both 20CN and 21CN data.

Those skilled in the art will appreciate that the above embodiments of the invention are simplified for brevity and to avoid rehearsing quantities of detail with which the skilled reader would already be well familiar. Those skilled in the art will moreover recognise that several equivalents to the features described in each embodiment exist. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

The content of the attached abstract is incorporated herein, as follows. A test system for testing a pair of telecommunications access networks, e.g. as part of transfer engineering. The system comprises a test head for connection, via an access arrangement, to first and second access networks. In a first phase, the access arrangement is arranged to connect the test head to the first access network for sending a first request from the tester to, for example, a CLI server via the first access network. The first request comprises a parameter associated with a user line. The tester is arranged to receive in response to the first request a first identifier from the server. In a second phase, the access arrangement is arranged to connect the test head to the second access network for sending a second request from the test head through the second access network to, for example, a CLI server. The second request also comprises the parameter. The tester is arranged to receive, in response to the second request, a second identifier from the target server and is arranged to carry out a comparison operation involving the first and second identifiers received in response to the two requests. A mismatch can indicate a fault or misconnection in either access network or a problem with network configuration data.

What is claimed is:

1. A method of testing a first telecommunications access network and a second telecommunications access network, the method comprising:
    sending a first request from a test point on the second access network to a server via the first access network, in which the first request comprises a parameter associated with a user line;
    in response to the first request, receiving a first identifier from the server;
    sending a second request from the test point through the second access network to a server, in which the second request also comprises the parameter;
    in response to the second request, receiving a second identifier from the server; and
    carrying out a comparison operation involving the first and second identifiers received in response to the two requests;
    in which the comparison operation includes comparing, the first identifier with the second identifier.

2. A method as claimed in claim 1 in which the comparison operation is performed in test equipment forming part of the second access network.

3. A method as claimed in claim 1 further comprising connecting the test point to a distribution frame connected to the first access network.

4. A test system for a first telecommunications access network and a second telecommunications access network, comprising:
    test equipment for connection via an access arrangement to the first and second access networks;
    in which the access arrangement is arranged to connect the test equipment to the first access network for sending a first request from the test equipment to a server via the first access network, in which the first request comprises a parameter associated with a user line;

in which the test equipment is arranged to receive in response to the first request a first identifier from the server;

in which the access arrangement is arranged to connect the test equipment to the second access network for sending a second request from the test equipment through the second access network to a server, in which the second request also comprises the parameter;

in which the test equipment is arranged to receive in response to the second request a second identifier from the server;

in which the test equipment is arranged to carry out a comparison operation involving the first and second identifiers received in response to the two requests; and in which the access arrangment is arranged to be connected in the second access network between the user and a central telecommunicatons network to connect the test equipment towards the user for the first request and towards the central telecommunications network for the second request.

5. A method of testing a first telecommunications access network and a second telecommunications access network, the method comprising:

sending a first request from a test point on the second access network to a server via the first access network, in which the first request comprises a parameter associated with a user line;

in response to the first request, receiving a first identifier from the server;

sending a second request from the test point through the second access network to a server, in which the second request also comprises the parameter;

in response to the second request, receiving a second identifier from the server; and carrying out a comparison operation involving the first and second identifiers received in response to the two requests;

in which the comparison operation includes comparing, the first and second identifiers with the parameter.

6. A method as claimed in claim 5 in which the second access network is for connecting a user line transferred from the first access network.

7. A method as claimed in claim 5 further comprising checking access network configuration data.

8. A method as claimed in claim 5 further comprising using test equipment comprised in the first access network to perform further tests.

9. A method of testing a first telecommunications access network and a second telecommunications access network, the method comprising:

sending a first request from a test point on the second access network to a server via the first access network, in which the first request comprises a parameter associated with a user line;

in response to the first request, receiving a first identifier from the server;

sending a second request from the test point through the second access network to a server, in which the second request also comprises the parameter;

in response to the second request, receiving a second identifier from the server; and carrying out a comparison operation involving the first and second identifiers received in response to the two requests;

using test equipment comprised in the first access network to perform further tests; and using the first access network test equipment to draw dial tone from first access network equipment in order to diagnose fault conditions.

10. A method of testing a first telecommunications access network and a second telecommunications access network, the method comprising:

sending a first request from a test point on the second access network to a server via the first access network, in which the first request comprises a parameter associated with a user line;

in response to the first request, receiving a first identifier from the server;

sending a second request from the test point through the second access network to a server, in which the second request also comprises the parameter;

in response to the second request, receiving a second identifier from the server;

carrying out a comparison operation involving the first and second identifiers received in response to the two requests; and using test equipment comprised in the first access network to perform further tests; and using the first access network test equipment to test a line from the first access network equipment in order to diagnose fault conditions.

11. A method of testing a first telecommunications access network and a second telecommunications access network, the method comprising:

sending a first request from a test point on the second access network to a server via the first access network, in which the first request comprises a parameter associated with a user line;

in response to the first request, receiving a first identifier from the server;

sending a second request from the test point through the second access network to a server, in which the second request also comprises the parameter;

in response to the second request, receiving a second identifier from the server; and carrying out a comparison operation involving the first and second identifiers received in response to the two requests;

in which the parameter is a directory number allocated to the user.

12. A method of testing a first telecommunications access network and a second telecommunications access network, the method comprising:

sending a first request from a test point on the second access network to a server via the first access network, in which the first request comprises a parameter associated with a user line;

in response to the first request, receiving a first identifier from the server;

sending a second request from the test point through the second access network to a server, in which the second request also comprises the parameter;

in response to the second request, receiving a second identifier from the server;

carrying out a comparison operation involving the first and second identifiers received in response to the two requests; and operating a test access matrix connected in the second access network between the user and a central telecommunications network to connect the second access network test equipment towards the user for the first request and towards the central telecommunications network for the second request.

13. A test system for a first telecommunications access network and a second telecommunications access network, comprising:
   test equipment for connection via an access arrangement to the first and second access networks;
   in which the access arrangement is arranged to connect the test equipment to the first access network for sending a first request from the test equipment to a server via the first access network, in which the first request comprises a parameter associated with a user line;
   in which the test equipment is arranged to receive in response to the first request a first identifier from the server;
   in which the access arrangement is arranged to connect the test equipment to the second access network for sending a second request from the test equipment through the second access network to a server, in which the second request also comprises the parameter;
   in which the test equipment is arranged to receive in response to the second request a second identifier from the server; and
   in which the test equipment is arranged to carry out a comparison operation involving the first and second identifiers received in response to the two requests;
   in which the comparison operation includes comparing, the second identifier with the first identifier.

14. A test system as claimed in claim 13 in which the test equipment is arranged for operation in the second access network.

15. A test system as claimed in claim 13 in which the access arrangement is arranged to connect the test equipment to a distribution frame connected to the first access network.

16. A test system for a first telecommunications access network and a second telecommunications access network, comprising:
   test equipment for connection via an access arrangement to the first and second access networks;
   in which the access arrangement is arranged to connect the test equipment to the first access network for sending a first request from the test equipment to a server via the first access network, in which the first request comprises a parameter associated with a user line;
   in which the test equipment is arranged to receive in response to the first request a first identifier from the server;
   in which the access arrangement is arranged to connect the test equipment to the second access network for sending a second request from the test equipment through the second access network to a server, in which the second request also comprises the parameter;
   in which the test equipment is arranged to receive in response to the second request a second identifier from the server;
   in which the test equipment is arranged to carry out a comparison operation involving the first and second identifiers received in response to the two requests; and
   in which the parameter is a directory number allocated to the user.

17. A test system for a first telecommunications access network and a second telecommunications access network, comprising:
   test equipment for connection via an access arrangement to the first and second access networks;
   in which the access arrangement is arranged to connect the test equipment to the first access network for sending a first request from the test equipment to a server via the first access network, in which the first request comprises a parameter associated with a user line;
   in which the test equipment is arranged to receive in response to the first request a first identifier from the server;
   in which the access arrangement is arranged to connect the test equipment to the second access network for sending a second request from the test equipment through the second access network to a server, in which the second request also comprises the parameter;
   in which the test equipment is arranged to receive in response to the second request a second identifier from the server;
   in which the test equipment is arranged to carry out a comparison operation involving the first and second identifiers received in response to the two requests; and
   in which the comparison operation includes comparing, the second and first identifiers with the parameter.

18. A test system as claimed in claim 17 in which the second access network is for connecting a user line transferred from the first access network.

19. A test system as claimed in claim 17 including means for checking access network configuration data.

20. A test system as claimed in claim 17 arranged to use test equipment comprised in the first access network to perform further tests.

21. A test system for a first telecommunications access network and a second telecommunications access network, comprising:
   test equipment for connection via an access arrangement to the first and second access networks;
   in which the access arrangement is arranged to connect the test equipment to the first access network for sending a first request from the test equipment to a server via the first access network, in which the first request comprises a parameter associated with a user line;
   in which the test equipment is arranged to receive in response to the first request a first identifier from the server;
   in which the access arrangement is arranged to connect the test equipment to the second access network for sending a second request from the test equipment through the second access network to a server, in which the second request also comprises the parameter;
   in which the test equipment is arranged to receive in response to the second request a second identifier from the server;
   in which the test equipment is arranged to carry out a comparison operation involving the first and second identifiers received in response to the two requests;
   in which test equipment comprised in the first access network is used to perform further tests; and
   in which the test system is arranged to use first access network test equipment to draw dial tone from first access network equipment in order to diagnose fault conditions.

22. A test system for a first telecommunications access network and a second telecommunications access network, comprising:
   test equipment for connection via an access arrangement to the first and second access networks;
   in which the access arrangement is arranged to connect the test equipment to the first access network for sending a first request from the test equipment to a server via the first access network, in which the first request comprises a parameter associated with a user line;

in which the test equipment is arranged to receive in response to the first request a first identifier from the server;

in which the access arrangement is arranged to connect the test equipment to the second access network for sending a second request from the test equipment through the second access network to a server, in which the second request also comprises the parameter;

in which the test equipment is arranged to receive in response to the second request a second identifier from the server;

in which the test equipment is arranged to carry out a comparison operation involving the first and second identifiers received in response to the two requests;

in which test equipment comprised in the first access network is used to perform further tests; and in which the test system is arranged to use the first access network test equipment to test a line from the first access network equipment in order to diagnose fault conditions.

* * * * *